United States Patent [19]

Jonda

[11] 4,050,827

[45] Sept. 27, 1977

[54] FORCE TRANSMITTING STRUCTURAL MEMBER

[75] Inventor: Wolfgang Jonda, Oberpframmern, Germany

[73] Assignee: Messerschmitt-Bolkow-Blohm G.m.b.H., Munich, Germany

[21] Appl. No.: 612,102

[22] Filed: Sept. 10, 1975

[30] Foreign Application Priority Data

Sept. 14, 1974 Germany .............................. 2444084

[51] Int. Cl.$^2$ ......................... B25G 3/00; A44B 21/00
[52] U.S. Cl. .................................. 403/11; 24/731 A; 24/122.6
[58] Field of Search ............. 24/122.6, 122.3, 265 EE, 24/73 A; 403/11, 210

[56] References Cited

U.S. PATENT DOCUMENTS

| 1,835,068 | 12/1931 | Livermore | 24/122.3 |
| 2,225,865 | 12/1940 | Harris | 403/210 |
| 2,327,831 | 8/1943 | Sutton | 24/122.6 |
| 2,426,538 | 8/1947 | Wehrden | 403/210 |
| 3,333,310 | 8/1967 | Lagarde | 24/265 EE |
| 3,370,483 | 2/1968 | Ditlinger | 24/265 EE |
| 3,725,981 | 4/1973 | Pinckney | 24/122.3 |
| 3,829,937 | 8/1974 | Metzler | 24/122.6 |
| 3,909,886 | 10/1975 | Hocke | 24/122.6 |
| 3,932,697 | 1/1976 | Hood | 403/210 |

FOREIGN PATENT DOCUMENTS

| 107,720 | 6/1943 | Sweden | 24/122.6 |
| 5,668 of | 1914 | United Kingdom | 403/210 |
| 24,449 of | 1914 | United Kingdom | 24/122.6 |

*Primary Examiner*—Bernard A. Gelak
*Attorney, Agent, or Firm*—Toren, McGeady and Stanger

[57] ABSTRACT

A structural member capable of transmitting both tensile and compressive forces is made up of a first component and a second component each capable of transmitting the load which the structural member is designed to carry. The first component is formed of a structural metal while the second component consists of fiber-reinforced synthetic plastic material fibers wound on the first component in the elongated direction of the structural member. If the first component fails, then the second component made up of the longitudinally wound fibers can take over the transmission of the designed load.

11 Claims, 5 Drawing Figures

FORCE TRANSMITTING STRUCTURAL MEMBER

SUMMARY OF THE INVENTION

The present invention is directed to a structural member for use in the vehicle and machine-building industries and, more particularly, for aerospace applications.

The structural members of the type incorporating the present invention are used in various aerospace devices for transmitting control or other forces.

Typically, structural members used for transmitting tensile and compressive forces have, up to the present time, been designed so that their life expectancy at least equals that of the other elements in the device in which they are used. However, such prior art elements used for transmitting control or other forces have become subjected to increased risks of premature damage due to the failure of the material used or due to external influences. Under such precarious circumstances, the structural members must be provided with a strength which exceeds the required minimum ultimate stress values obtained by calculation. However, members designed in this manner have an increased weight without providing the required safety.

Therefore, it is the primary object of the present invention to provide a structural member which is capable of transmitting both tensile and compressive forces and is formed of two separate structural components so that a failure of one will not interfere with the ability of the member to transmit the forces for which it is designed. Such structural members can be used in locations which expose the member to the most dangerous conditions so that should a failure of one component occur, the other component will still be capable of transmitting the designed forces. The remaining operative component must be capable of transmitting the forces for an estimated time period during which a replacement member can be substituted. In other words, the combination of the two structural components within the member afford a fail-safe element. In accordance with the present invention, the structural member has a pair of load paths through which forces can be transmitted. There is a primary load path and a secondary load path which will transmit forces even though a failure prevents passage of the forces through the primary load path. Preferably, the component forming the secondary load path is formed by winding fiber-reinforced synthetic plastic material fibers around a base part of the structural element which is formed of structural metal. The base part forms the primary load path. Experiments have shown that a structural element embodying this dual load path construction offers advantages both in rigidity and weight and though one of the components fails, the other will continue to afford the transmission of the forces for which the member is designed.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which preferred embodiment of the invention is illustrated and described.

DETAIL DESCRIPTION OF THE INVENTION

Figure 1:
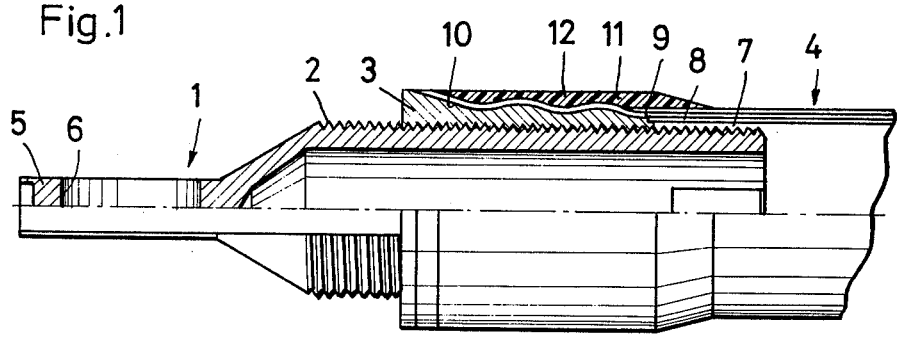
FIG. 1 is a sideview, partly in section, of one end of a structural member embodying the present invention.

A structural member for the transmission of tensile and compressive forces is made up of two connecting end sections 1 with a cylindrically shaped rod-like intermediate section 4 extending between the end sections.

For simplicity's sake, only one end section 1 is shown in the drawing and the end section is intended to connect the structural member to another part from which or to which it transmits tensile or compressive forces.

Figure 2:
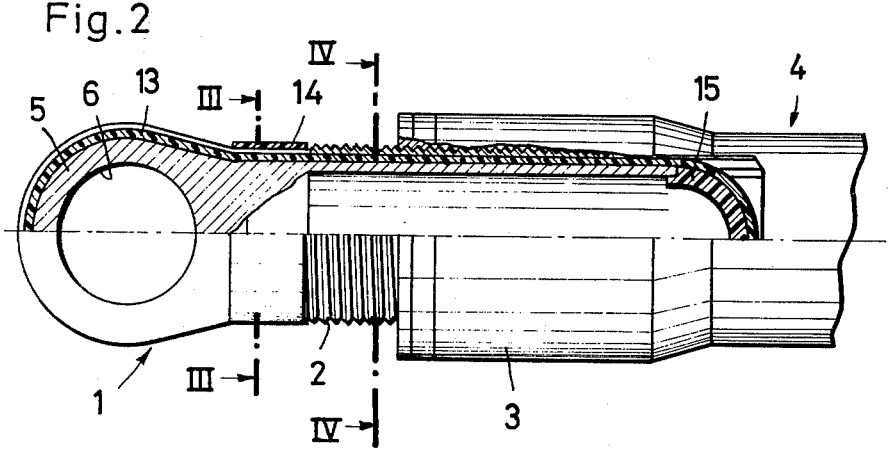
FIG. 2 is a sideview of the structural member shown in FIG. 1 rotated 90° relative to the position shown in FIG. 1.

As indicated in FIGS. 1 and 2, the end section 1 is secured to a tubular sleeve 3 by means of a male thread 2 on the end member which fits into a female thread within the sleeve. The end of the end section extending outwardly from the sleeve has a transition section which changes from the cylindrically shaped section containing the thread 2 to a flattened section 5 having an opening or hole 6 through it to provide a connection to another part. The opening 6 serves as a coupling to a control member or the like. The rod-like intermediate section consists of two parts or two components. One component, a tube 7, serves as a foundation element to which the sleeve 3 is adhered in a force-locking manner. The second component or part of the intermediate section is provided by several winding layers 8, 9 made of different fiber material and having different winding angles which are wound successively on the combined foundation formed by the combination of the tube 7 and the sleeve 3. The winding layers 8 and 9 extend longitudinally over the foundation or mandrel and consist of pre-impregnated rovings with at least circumferential winding made of a carbon-fiber reinforced material wound over the layers 8, 9.

The layers 8 and 9 engage the sleeve 3 along its full axial extent and fit into groove-shaped recesses 10 in the outer surface of the sleeve. Moreover, additional wound layers 11, 12 extending circumferentially about the sleeve serve to provide a firm attachment of the longitudinally extending wound fibers to the surface of the sleeve. The materials used are secured together in such a way that tube 7 and sleeve 3 are secured together in an optimum manner for the transmission of forces. One of the force transmitting components of the intermediate section 4 is made up of the metal sleeve 3 and metal tube 7 and the other component is made up of the longitudinally extending fiber layers 8, 9.

The end section 1 is connected to the intermediate section 4 by means of the male thread 2 which is screwed into the female thread within the sleeve 3 and this connection serves as the primary load path between these two parts. In view of the adjustability in the longitudinal direction afforded by the threaded connection between the end section and the intermediate section the structural member can be adjusted to the distance between parts it connects.

Figure 3:
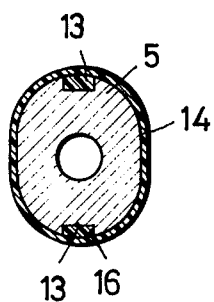
FIG. 3 is a sectional view taken along the line III—III in FIG. 2.
Figure 4:
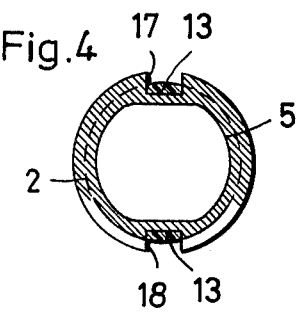
FIG. 4 is a sectional view taken along the line IV—IV in FIG. 2.

In FIGS. 2, 3 and 4 the end section 1 also includes two components for transmitting force. The end section 1 transmits force over the threaded connection to or from the intermediate section 4. In addition to the metal member forming the end section 1 containing the opening 6 which provides one of the load transmitting components, a fiber-reinforced synthetic plastic material 13 is wound around the end section in the longitudinal direction of the structural member. To afford a kink-free routing of the individual fibers of the synthetic plastic material 13 around the end of the end member 1 positioned within the sleeve 3, a transition member 15 is inserted into the tubular shaped portion of the end section which provides the threaded connection with the sleeve. The transition member 15 can, for example, be made of a synthetic plastic material and, as is illustrated in FIG. 2, it is inserted into the open end of the tubular portion of the end section 1. As can be seen more clearly in FIGS. 3 and 4, the fibers or strands of the synthetic plastic material 13 are wound in an indentation or recess 16 which is located on diametrically opposite sides of the tubular shaped part of the end section and extends around the end part of the end section which contains the opening 6. By positioning the synthetic plastic material 13 within the recess 16, it cannot slide or be displaced from the end section. To afford the threaded connection between the end section and the intermediate section, the recess 16 is formed in the end section so that it extends inwardly from the base or roots of the threads, note FIG. 4. As a result, the synthetic plastic material 13 within the threaded portion of the end section 1, does not interfere with the threading action into the sleeve 3 of the intermediate section 4. In addition, fibers or strands 14 are wound circumferentially around the transition portion of the end section between the tubular part and the flattened part containing the opening 6 to hold the synthetic plastic material tightly within the recess 16. The circumferentially wound fibers 14 also consist of fiber-reinforced synthetic plastic material.

The fibers or strands of the synthetic plastic material 13 wound around the metallic portion of the end section 1 are dimensioned so they can fully absorb any load supplied to the end section during operation of the structural member. In other words, if the metal part of the end section 1 should fracture, it is possible for the synthetic plastic material to take over and transmit the forces previously transmitted by the metal part. Each of the two components of the end section is designed to transmit the normal operational load acting on the end section for a predetermined time interval, for example, for at least the time interval between two programmed inspections.

The synthetic plastic material 13 has a E-modulus smaller than the E-modulus of the structure material forming the first component of the end member. However, the E-moduli of the two components forming the end section may be the same.

Figure 5:
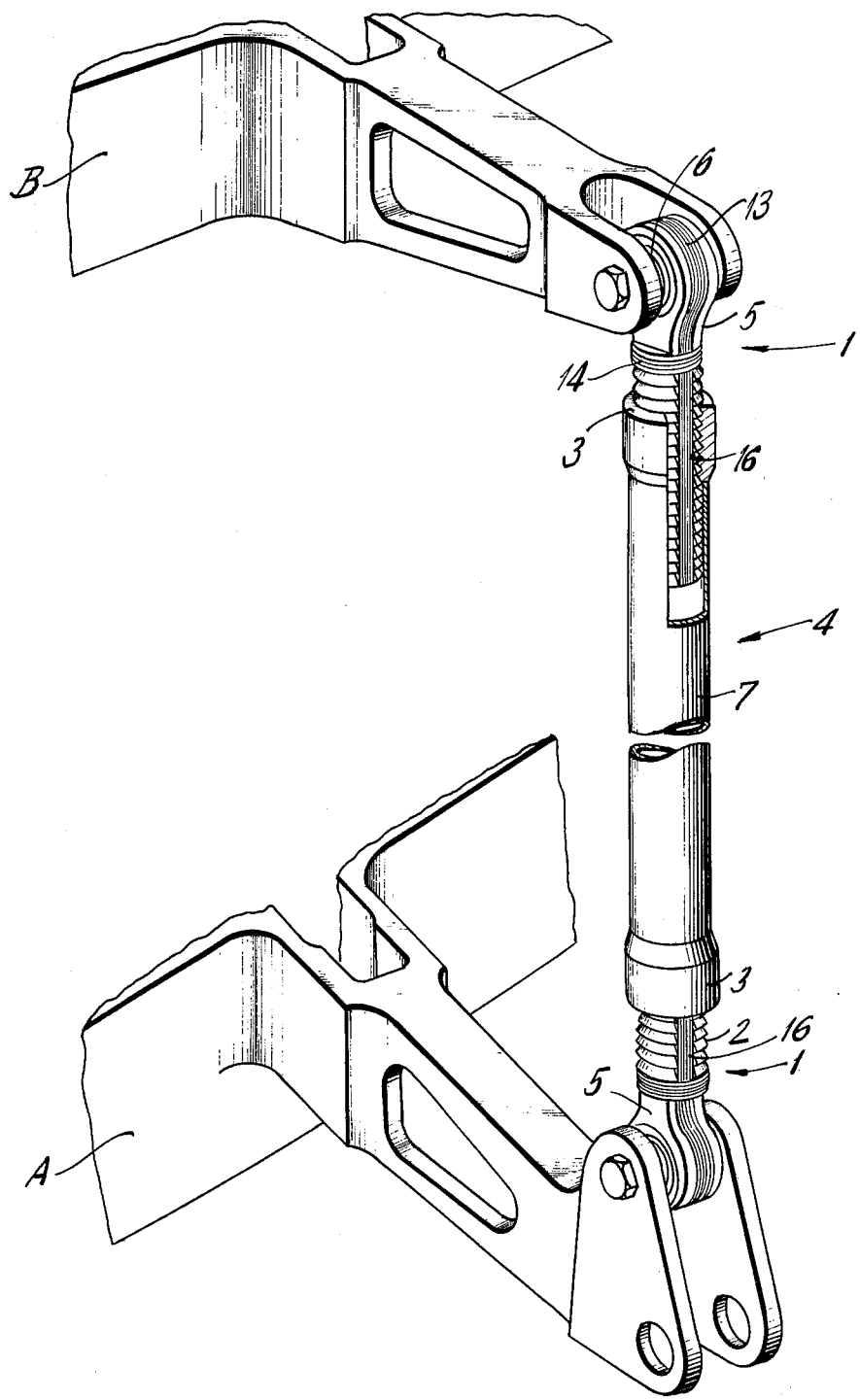
FIG. 5 is a perspective view of the structural member of FIG. 1 interconnecting two other members.

In FIG. 5, the structural member consisting of two end sections is interconnected by the intermediate section 4 extending between a wobble plate A and a blade root B of a rotor arm. The structural member acts as a steering rod with one end section 1 connected to the wobble plate A and the other end section connected to the blade root B.

While a specific embodiment of the invention has been shown and described in detail to illustrate the application of the inventive principles, it will be understood that the invention may be embodied otherwise without departing from such principles.

I claim:

1. A structural member capable of transmitting both tensile and compressive stresses and of transmitting a predetermined load, comprising an elongated part, said part comprising at least one end section and a separate intermediate section with said at least one end section and intermediate section coupled together as a unit, said at least one end section projecting outwardly from said intermediate section and each capable of transmitting the predetermined load of the structural member, wherein the improvement comprises that said at least one end section includes a first subsection and a second subsection spaced apart in the elongated direction of said elongated part and integrally joined together, said first subsection forming the end of said end section spaced from said intermediate section and having attaching structure adjacent the end of said end sections spaced from said intermediate section, said second subsection having a connecting structure on the exterior thereof for connecting said end section to said intermediate section, the attaching structure in said first subsection arranged for attaching said end section to a different member for transmitting the predetermined load between said elongated part and the different member, said second subsection having grooves formed in the exterior surface on opposite sides thereof with the grooves extending in the elongated direction of said part, the grooves penetrating inwardly from the exterior surface through the connecting structure in the exterior surface of said second subsection so that the base of the grooves are spaced inwardly from the connecting structure, said end section being capable of transmitting the predetermined load in the elongated direction of said elongated part between said first and second subsections, said end section including a fiber-reinforced synthetic plastic material wound in a continuous manner in the elongated direction of said elongated part around both the first and second subsections with the fiber-reinforced synthetic plastic material being located in the grooves in said second subsection and extending transversely of the attaching structure in said first subsection of said at least one end section, and the integrally joined said first and second subsections and said fiber-reinforced synthetic plastic material each having a different E-modulus and said integrally joined first and second subsections and said fiber-reinforced synthetic plastic material wound thereon each being capable of transmitting the predetermined load so that if a failure of said integrally joined first and second subsections occurs said plastic material can transmit the predetermined load.

2. A structural member, as set forth in claim 1, wherein the fiber-reinforced synthetic plastic material is wound in the form of strands on said at least one end section.

3. A structural member, as set forth in claim 1, wherein the integrally joined said first and second subsections of said at least one end section are formed of a structural metal and the strands of said fiber-reinforced synthetic plastic material are wound on said first and second subsections with such strands adhered directly to said first and second subsections.

4. A structural member, as set forth in claim 1, wherein said first subsection comprises a flattened portion containing said attaching structure comprising an opening through said flattened portion for connecting said elongated part to the different member and the connecting structure of said second subsection comprises a threaded portion extending in the elongated direction of said elongated part, a transition subsection joining from said flattened portion and said threaded portion, and said threaded section having a male thread thereon.

5. A structural member, as set forth in claim 4, wherein said threaded portion of said second subsection having said grooves formed therein extending in the elongated direction of said elongated part and extending transversely of the threads in the male thread, the base of said grooves being spaced radially inwardly from the roots of said threads in the male thread, and said fiber-reinforced synthetic plastic material strands of said at least one end section being wound in the grooves on said threaded portion with the plastic material strands being located radially inwardly from the roots and said threads.

6. A structural member, as set forth in claim 5, wherein said flattened portion having a groove forming a continuation of the grooves in said threaded portion with said groove in said flattened portion extending on opposite sides of said flattened portion which opposite sides extend in the elongated direction of said elongated part and transversely of the opening therethrough, and said fiber-reinforced synthetic plastic material strands being continually wound in the grooves in said threaded portion and flattened portion.

7. A structural member, as set forth in claim 5, wherein said threaded portion is cylindrically shaped and provided with said groove on the diametrically opposite sides thereof, a transition member fitted in the opposite end of said threaded portion from said flattened portion and said transition member forming a bridging member supporting said synthetic plastic material strands as they extend around the end of said threaded portion.

8. A structural member, as set forth in claim 2, wherein said intermediate section being formed of a structural steel member and fiber-reinforced synthetic plastic material strands wound on said structural steel member in the elongated direction of said intermediate section.

9. A structural member, as set forth in claim 8, wherein said intermediate section includes a tubular sleeve having a female thread therein at the end to which said connecting structure in at least one end section is connected, said first subsection of said end section comprising a flattened portion said second subsection comprising a cylindrically shaped portion including said connecting structure which comprises a threaded portion, and a transition subsection extending in the elongated direction of said intermediate section between said flattened portion and said threaded cylindrically shaped portion, said threaded portion of said cylindrically shaped portion comprising a male thread engageable in the female thread of said sleeve on said intermediate section.

10. A structural member, as set forth in claim 9, wherein said flattened portion of said first subsection of said end section having at least one groove therein extending around the end of and two opposite narrow sides of said flattened portion which narrow sides extend in the elongated direction of said intermediate member and form a continuation of the grooves in said second subsection with said strands being wound continuously through the grooves in said first subsection and second subsection.

11. A structural member, as set forth in claim 10, wherein said grooves in said cylindrically shaped second section being formed on the diametrically opposite sides thereof, a transition member fitted in the end of said second subsection is connected, and said transition member forming a bridging member supporting such strands as they extend around the end of said second subsection between the grooves therein.

* * * * *